March 18, 1924.

C. W. WERDENHOFF

TRACTOR MACHINE

Filed Dec. 26, 1922    2 Sheets-Sheet 2

1,487,128

INVENTOR:
C. W. WERDENHOFF.
BY Whiteley and Ruckman
ATTORNEYS

Patented Mar. 18, 1924.

1,487,128

UNITED STATES PATENT OFFICE.

CHARLES W. WERDENHOFF, OF MINNEAPOLIS, MINNESOTA.

TRACTOR MACHINE.

Application filed December 26, 1922. Serial No. 608,915.

*To all whom it may concern:*

Be it known that I, CHARLES W. WERDENHOFF, a citizen of the United States, residing at Minneapolis, in the county of Hennepin and State of Minnesota, have invented certain new and useful Improvements in Tractor Machines, of which the following is a specification.

My invention relates to tractor machines, and particularly to the construction of the tractor members which cause the tractor to be propelled over the ground. An object is to provide tractor members which are used in place of driving wheels, these tractor members being strong and durable and requiring a comparatively small amount of material. An object in particular is to provide tractor members in which extended surfaces are placed in succession upon the ground and upon which surfaces the tractor is adapted to be moved either forwardly or backwardly in accordance with the direction of movement in which the extended surfaces are laid upon the ground.

The full objects and advantages of my invention will appear in connection with the detailed description and the novel features embodied in my inventive idea will be particularly pointed out in the claims.

Figure 1:
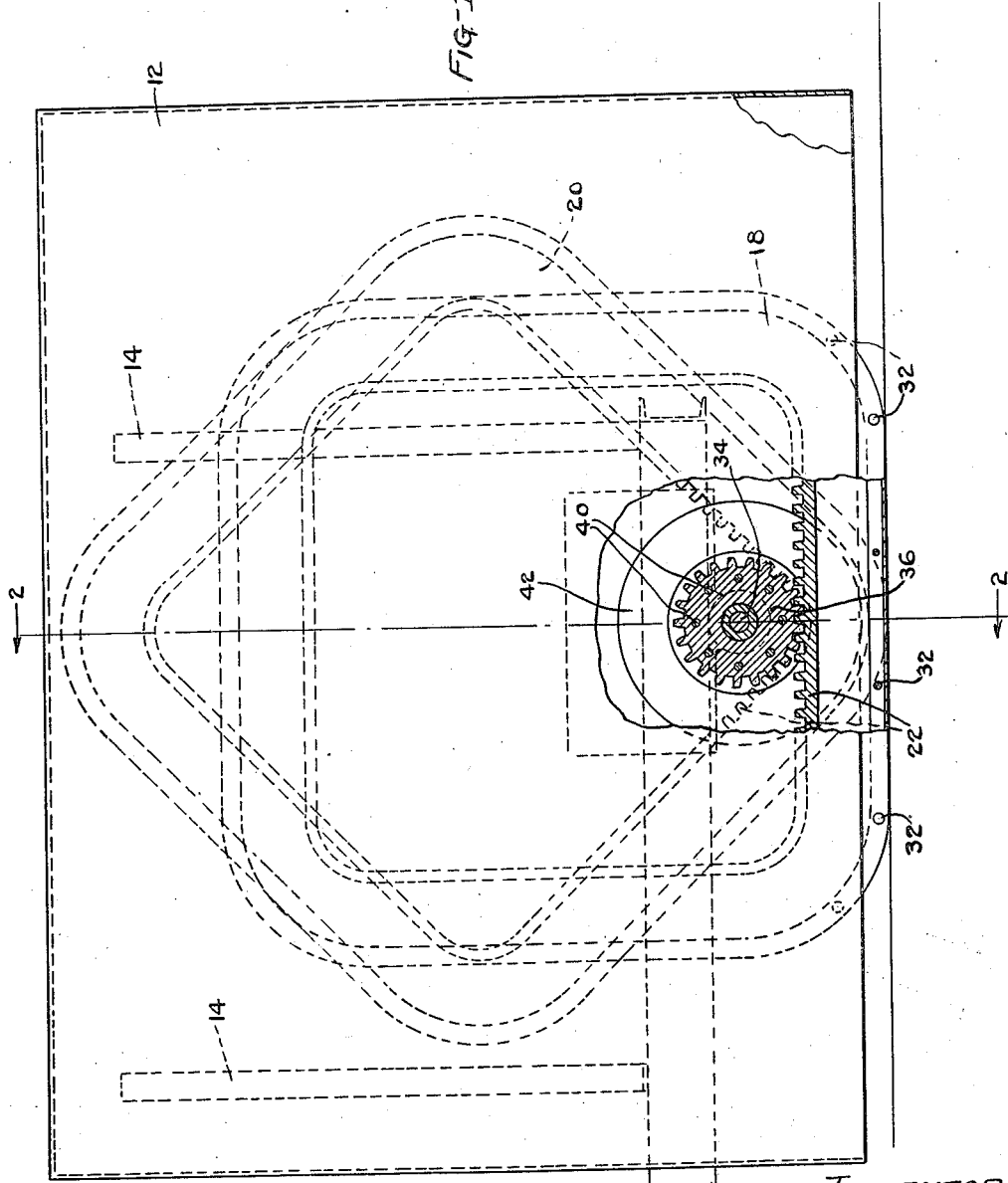
Figure 2:
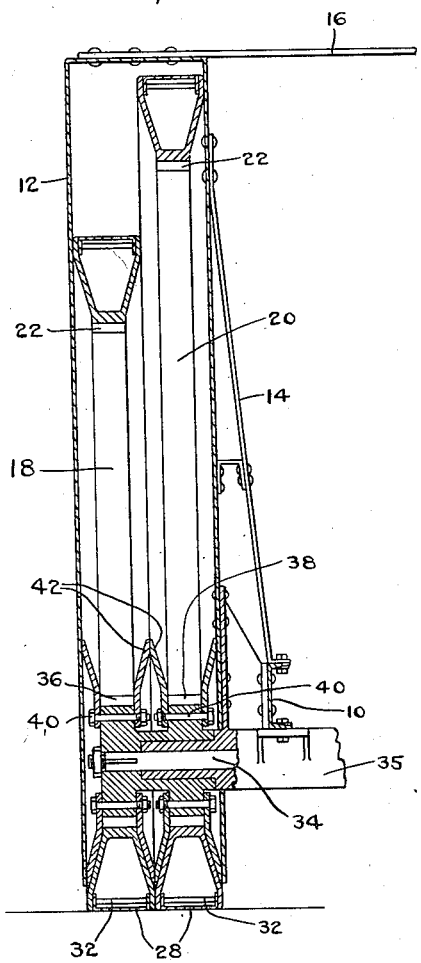
Figure 4:
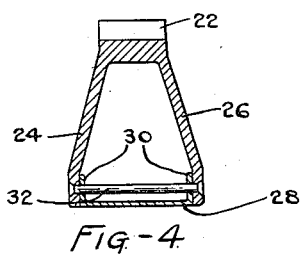
Figure 3:
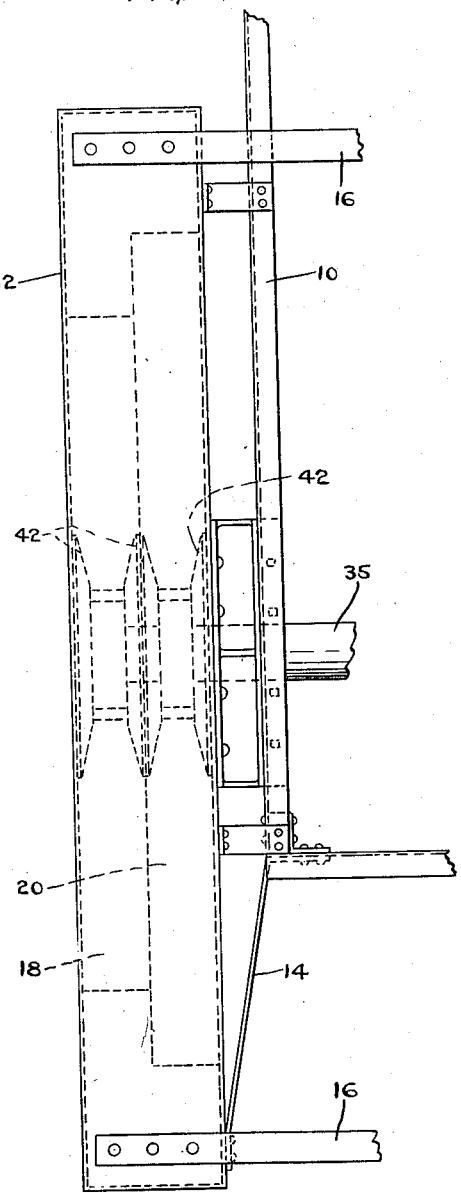

The drawings illustrate the structure sufficiently to indicate that a tractor machine is provided with two tractor members mounted at substantially the position occupied by ordinary driving wheels, one of the tractor members being shown in detail and it being understood that there is a similar tractor member at the other side of the machine operated from the same driving shaft or axle. In the drawings, Fig. 1 is a view of one of the tractor members shown mostly in side elevation but with a small portion in section. Fig. 2 is a view in vertical section on the line 2—2 of Fig. 1. Fig. 3 is a top plan view. Fig. 4 is a detail view in vertical section.

Referring to the construction shown in the drawings, the numeral 10 designates the rear portion of a tractor frame which may be of any customary or suitable construction and which it is not necessary to illustrate in detail. Secured to the rear corners of the frame are sheet metal casings 12 which are open on the lower sides. Both of these casings and the mechanism contained therein are alike, and hence a description of one of them will be sufficient for an understanding of the invention. The two casings are rigidly secured to the frame by means of braces 14 while crossed braces 16 serve to tie the two casings together. Positioned on each of the casings 12 are two open center rectangular supporting members 18 and 20 having rounded corners as shown in Fig. 1. Endless racks 22 extend entirely around the inner margins of these supporting members while the outer margins thereof are hollow and divergently flared to form the walls 24 and 26, the hollow space between which is closed by endless ground engaging bands 28 having inwardly turned flanges 30. A series of pins 32 extend through the flanges 30 and through the outer straight portions of the walls 24 and 26 whereby the bands 28 are secured in place. A driving axle 34 which may be driven in the customary and well known manner is mounted for rotation in a housing 35. Secured to each end of the axle 34 is a pair of pinions 36 and 38 which mesh respectively with the racks 22 of the two members 18 and 20. Secured by bolts 40 to the sides of the pinions 36 and 38 are annular flanges 42 which are flared so as to fit upon the flared walls 24 and 26 whereby the pinions 36 and 38 are maintained in engagement with the teeth of the two endless racks 22. As shown in Fig. 2 the pinion 36 is keyed to the end of the axle 34, the pinion 38 is connected with the pinion 36 by an integral ring, and the pinion 38 is rotatably mounted on the reduced end of the housing 35 which constitutes a bearing therefor.

The operation and advantages of my invention will now be readily understood. Rotation of the axle 34 causes rotation of the two pinions 36 and 38 which mesh with the endless racks of the two supporting members 18 and 20. As will be apparent from Fig. 1, these two supporting members are so arranged that when the pinion 36 is at the middle of one side of the member 18, the pinion 38 will be at one corner of the member 20 and vice versa. When one of the pinions reach a corner of its cooperating supporting member, this member is given a quarter turn upon its rounded edge and the pinion works its way along the straight rack thus laid down until the next corner is reached, when the operation is repeated. Since the two supporting members are turned in alternation with each other, there will always be a straight rack portion resting upon the ground and upon which the tractor or other machine moves. Since the tractor members have extended surfaces, the machine may be moved over soft ground without sinking into the same to any great extent. It is obvious that the machine may be moved in either direction according to the direction of rotation of the driving axle. The machine when in use will not cut up the ground but will pack it and leave it smooth. The machine when used as a tractor can be used to plow in either direction without turning at the end since it can be started straight back with the necessity only of turning the plow. When gravel is to be placed on roads, the machine can be used to pull the gravel wagons which are hitched to one end and when it is desired to start back in the opposite direction, the wagons can be unhitched and after the machine has been started back the wagons can be hitched to the other end of the machine. The tractor can also be advantageously used for concrete road building and for use in connection with steam shovels, drags and scrapers. If desired, the machine can be constructed without a motor and pulled by horses in the manner of a common frame wagon over soft fields since instead of common wheels it has tractor members which will not sink to any great extent into the soft earth.

I claim:

1. The combination with the frame and axle of a vehicle, of two pinions secured to the axle, a casing associated with the frame, two endless ground engaging rack members within said casing and with which said pinions mesh respectively and upon which said pinions travel to give a partial rotation in alternation with each other, and means for maintaining said pinions in mesh with said rack members.

2. The combination with the frame and axle of a vehicle, of two pinions secured to the axle, a casing associated with the frame, two endless ground engaging rack members within said casing and with which said pinions mesh respectively and upon which said pinions travel to give a partial rotation in alternation with each other, said rack members having walls flaring outwardly from the endless rack portion and outwardly flaring annular flanges secured to said pinions which fit upon said flaring walls.

3. The combination with the frame and axle of a vehicle, of two pinions secured to the axle, a casing associated with the frame, two endless ground engaging rack members within said casing and with which said pinions mesh respectively and upon which said pinions travel to give a partial rotation in alternation with each other, said rack members having hollow outer portions with flaring walls surrounding the endless rack portions, endless bands secured to the outer margins of said flaring walls, and outwardly flaring annular flanges secured to said pinions which fit upon said flaring walls.

In testimony whereof I hereunto affix my signature.

CHARLES W. WERDENHOFF.